US012307947B2

(12) United States Patent
Wang et al.

(10) Patent No.: US 12,307,947 B2
(45) Date of Patent: May 20, 2025

(54) DISPLAY APPARATUS INCLUDING LED ARRAY

(71) Applicant: DYNASCAN TECHNOLOGY CORP., Taoyuan (TW)

(72) Inventors: Tsun-I Wang, Taoyuan (TW); Ching-Chun Wu, Taoyuan (TW); Chia-Liang Yang, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 0 days.

(21) Appl. No.: 17/972,450

(22) Filed: Oct. 24, 2022

(65) Prior Publication Data

US 2024/0135861 A1 Apr. 25, 2024
US 2024/0233612 A9 Jul. 11, 2024

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2320/0242* (2013.01); *G09G 2320/0626* (2013.01)

(58) Field of Classification Search
CPC ............... G09G 2320/0626; G09G 2320/0242
See application file for complete search history.

(56) References Cited

U.S. PATENT DOCUMENTS 6,747,617 B1 * 6/2004 Kawashima ......... G09G 3/3413 345/82
7,972,032 B2 * 7/2011 Meersman ................ F21K 9/00 362/311.15
8,610,749 B2 * 12/2013 Kishi ................... G09G 3/3283 345/690
10,004,118 B1 * 6/2018 Mi ......................... H05B 45/48
11,670,224 B1 * 6/2023 Cheng .................. G09G 3/2003 345/212

(Continued)

FOREIGN PATENT DOCUMENTS

CN 1471071 A * 1/2004
CN 113496672 A 10/2021

OTHER PUBLICATIONS

International Search Report & Written Opinion in PCT counterpart application PCT/CN2023/07063, dated Jul. 17, 2023, in 9 pages.

*Primary Examiner* — William Boddie
*Assistant Examiner* — Bipin Gyawali
(74) *Attorney, Agent, or Firm* — Duane Morris LLP

(57) ABSTRACT

The present disclosure provides a display apparatus including an LED array. The display apparatus comprises a light emitting diode (LED) array, a power source, a controller, a PWM switch, and a current source module. The controller is configured to generate a control signal for controlling a first LED column during a scan period. The PWM switch is electrically connected between the first LED column and a second power level. The current source module is electrically connected between the first LED column and the second power level. The current source module is configured to provide a current flow with multiple levels. The PWM switch is controlled based on a first portion of the control signal, and the amount of the current flow provided by the current source module in the scan period depends on a second portion of the control signal.

4 Claims, 11 Drawing Sheets

300D

(56) References Cited

U.S. PATENT DOCUMENTS

| | | | | |
|---|---|---|---|---|
| 11,792,900 | B2 * | 10/2023 | Chen | H05B 45/325 315/291 |
| 2004/0222950 | A1 * | 11/2004 | Kimura | G09G 3/325 345/76 |
| 2007/0182699 | A1 * | 8/2007 | Ha | G09G 3/3413 345/102 |
| 2018/0144715 | A1 * | 5/2018 | Shigeta | G09G 3/32 |
| 2020/0202769 | A1 * | 6/2020 | Yang | G09G 3/32 |
| 2021/0020101 | A1 * | 1/2021 | Van Eessen | G09G 3/006 |
| 2023/0269845 | A1 * | 8/2023 | Chou | H05B 45/54 315/294 |
| 2024/0135861 | A1 * | 4/2024 | Wang | G09G 3/3216 |

* cited by examiner

200C

200D

300B

300D

300E

DISPLAY APPARATUS INCLUDING LED ARRAY

BACKGROUND

1. Field of the Disclosure

The present disclosure relates to a display apparatus and a method for controlling the same. More particularly, the present disclosure relates to a display apparatus including a light emitting diode (LED) array and a method of controlling the LED array.

2. Description of the Related Art

Some display apparatuses may be implemented by a LED array. The brightness of each LED in the array may be controlled by the length of the lit time of each LED. As a finer intensity scale is required, a shorter lit time may be applied. If the brightness to be lit is too low, the lit time may be shorter than the response time of the LED and thus the LED may not be driven appropriately. In this case, server color shift of the display apparatus may be caused.

SUMMARY

A display apparatus implemented by a LED array, which may in turn be powered by a driver or power supply. Like other light sources, the brightness of the LEDs can be controlled or dimmed as desired for a given lighting application. Pulse width modulated (PWM) dimming is widely used for LED brightness control. In the PWM dimming method, brightness is controlled by lit time (or a conducted time) of the LED. If the brightness of the LED is high, the lit time may be longer. However, if the brightness of the LED to be lit is lower than a threshold (which may be determined based on the characteristics of the LED), the expected brightness may not be obtained. Therefore, a novel display apparatus and method of controlling the same may be necessary.

According to one embodiment, the present disclosure may be related to a display apparatus. The display apparatus comprises a light emitting diode (LED) array, a power source, a controller, a PWM switch, and a current source module. The light emitting diode (LED) array comprises a plurality of LED columns. The power source is electrically connected to the plurality of LED columns and is configured to provide a first power level. The controller is configured to generate a control signal associated with a first LED column among the plurality of LED columns for controlling the first LED column during a scan period. The PWM switch is electrically connected between the first LED column and a second power level. The current source module is electrically connected between the first LED column and the second power level. The current source module is configured to provide a current flow with multiple levels. The PWM switch is controlled based on a first portion of the control signal, and the amount of current flow provided by the current source module in the scan period depends on a second portion of the control signal.

According to another embodiment, the present disclosure may be related to a display apparatus. The display apparatus comprises a light emitting diode (LED), a power source, a controller, and a plurality of current paths. The LED array comprises a plurality of LED columns. The power source is electrically connected to the plurality of LED columns and is configured to provide a first power level. The controller is configured to generate a control signal associated with a first LED column among the plurality of LED column. The plurality of current paths is electrically connected between the first LED column and a second power level. The plurality of current paths are connected in parallel. The plurality current paths are activated or deactivated based on the control signal.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

Figure 1:
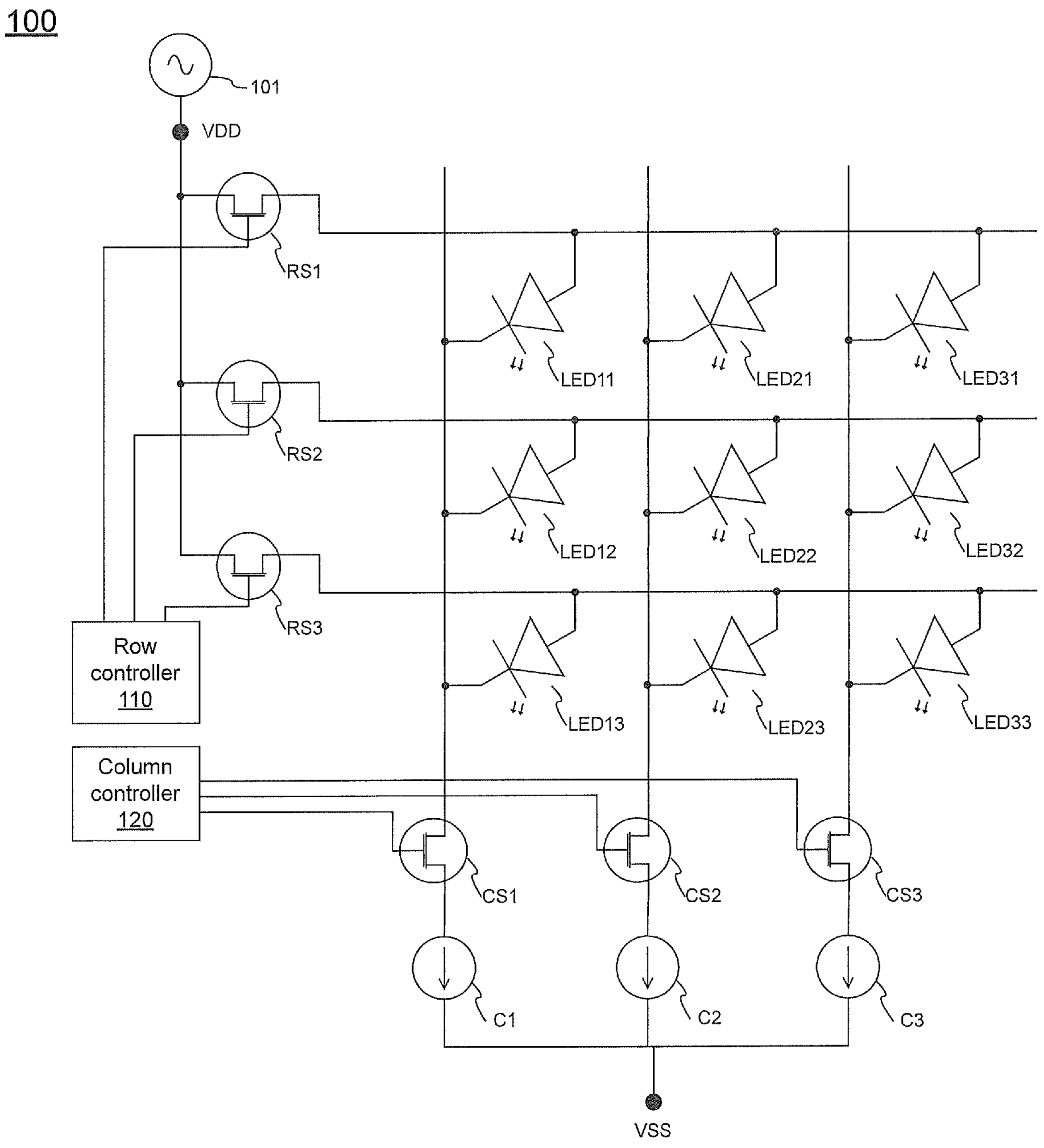
FIG. 1 illustrates a display apparatus according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the coupling or connection between a first feature and a second feature in the description that follows may include embodiments in which the first and second features are directly coupled or connected, and may also include embodiments in which additional features may be arranged between the first and second features, such that the first and second features may not be in direct coupled or connected. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several operations of a method may be only briefly described. Also, additional operations can be added, and certain of the following operations can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a display apparatus 100 according to some embodiments of the present disclosure. The display apparatus 100 includes a LED array. The LED array may include many LEDs. For the purpose of simplicity and clarity, the LED array of the display apparatus 100 includes 9 LEDs, i.e., LED11, LED12, LED13, LED21, LED22, LED23, LED31, LED32, and LED33.

A row of the LED array may be coupled to a row selector. For example, the LED11, LED21, and LED31 are coupled to the row selector RS1; the LED12, LED22, and LED32 are coupled to the row selector RS2; and the LED13, LED23, and LED33 are coupled to the row selector RS3. Each of the row selectors RS1, RS2, and RS3 may be a transistor. In FIG. 1, the anodes of the LEDs may be coupled to the corresponding row selectors. In FIG. 1, all the row selectors may be coupled to a power source 101. The power source 101 may provide a power level, e.g., voltage VDD.

A column of the array may be coupled to a column selector. For example, the LED11, LED12, and LED13 are coupled to the column selector CS1; the LED21, LED22, and LED23 are coupled to the column selector CS2; and the LED13, LED23, and LED33 are coupled to the column selector CS3. Each of the column selectors CS1, CS2, and CS3 may be a transistor. In FIG. 1, the cathodes of the LEDs may be coupled to the corresponding column selectors. In FIG. 1, all the column selectors may be coupled to the corresponding current source. For example, the column selector CS1 may be coupled to the current source C1; the columns selector CS2 may be coupled to the current source C2; and the column selector CS3 may be coupled to the current source C3. In FIG. 1, all the column selectors may be coupled to another power level, e.g., voltage VSS. In FIG. 1, all the current sources may be coupled to another power level, e.g., voltage VSS. The voltage VDD may have electrical potential exceeding that of the voltage VSS.

The row selectors RS1, RS2, and RS3 may be coupled to the row controller 110. In particular, the gates of the row selectors RS1, RS2, and RS3 are coupled to the row controller 110. The row controller 110 can control the switching of each of the row selectors RS1, RS2, and RS3. In particular, the row controller 110 can determine whether each of the row selectors RS1, RS2, and RS3 is on or off. The control signal generated by the row controller 110 can control which row selectors should be on and which row selectors should be off.

The column selectors CS1, CS2, and CS3 may be coupled to the column controller 120. In particular, the gates of the column selectors CS1, CS2, and CS3 are coupled to the column controller 120. The column controller 120 can control the switching of each of the column selectors CS1, CS2, and CS3. In particular, the column controller 120 can determine whether each of the column selectors CS1, CS2, and CS3 is on or off. The control signal generated by the column controller 120 can control which column selectors should be on and which column selectors should be off.

The display apparatus 100 in FIG. 1 may be driven by a passive-matrix method. When the screen refresh rate of the display apparatus 100 is 60 Hz, each screen may have 32 scans. In each scan period, one or more different rows may be refreshed by the corresponding row selectors (e.g., the row selectors RS1, RS2, and RS3). The LEDs in each row may be driven by a fixed current. For example, the LEDs in the first row of display apparatus 100 may be driven by the fixed current provided by the current source C1; the LEDs in the second row of display apparatus 100 may be driven by the fixed current provided by the current source C2; and the LEDs in the third row of display apparatus 100 may be driven by the fixed current provided by the current source C3.

The brightness or illuminance of each LED of the display apparatus 100 may be controlled by a PWM dimming method. In some embodiments, different PWM signals can cause a LED to be lit for different time periods. For example, if the required brightness of a LED is higher, the corresponding PWM signal can cause the LED to be lit for a longer time period. If the required brightness of a LED is lower, the corresponding PWM signal can cause the LED to be lit for a shorter time period. The PWM signals may be fed to the corresponding column selectors. For example, the PWM signals may be generated by the column controller 120 and fed to the gates of the corresponding column selectors (e.g., column selectors CS1, CS2, and CS3).

Table 1 shows an exemplary true value table for a PWM signal. For simplicity and clarity, the PWM signal shown in Table 1 is a 3-bit signal. Therefore, the 3-bit PWM signal can indicate 8 different brightness levels. The PWM signal may be fed to each of the column selectors CS1, CS2, and CS3. Different PMW signals may be fed to each of the column selectors CS1, CS2, and CS3 such that the one or more LED in the corresponding column are lit for different brightness levels.

TABLE 1

True Value Table

| PWM Value | BIT 2 | BIT 1 | BIT 0 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

In some embodiments, the display apparatus 100 may be operated under a 3-bit PWM gray scale system. The true value table of the 3-bit PWM gray scale system may be found in Table 1. The duty cycle of the 3-bit PWM gray scale system may be 12.5%

$$\left(\text{e.g., } \frac{1}{2^3} \times 100\%\right).$$

In general, a PWM signal may be a 14-bit gray scale. A PWM signal may have a length of 14 bits. When the screen refresh rate of the display apparatus 100 is 60 Hz, each screen has 32 scans, and a PWM signal has a length of 14 bits, the minimum lit time can be calculated as $$\frac{1\text{ s}}{60 \times 32 \times 2^{14}} = 31.8\text{ ns}.$$

The response time of a general LED may be 20 ns. When the lit time of a LED is too short, the LED may be not lit as expected. For example, when the lit time is too short, the brightness of the lit LED may be different from the expected brightness. Furthermore, the minimum lit time may be the base step time to adjust the brightness. The base step time may be too short to correctly reflect the corresponding step brightness.

In some embodiments, different PWM signals can cause a LED to be lit at different current levels. For example, if the required brightness of a LED is higher, the corresponding PWM signal can cause the LED to be lit by a stronger current. If the required brightness of a LED is lower, the corresponding PWM signal can cause the LED to be to be lit by a weaker current. The PWM signals may be fed to the corresponding column selectors and the corresponding current sources. For example, the PWM signals may be generated by the column controller 120 and fed to the gates of the corresponding column selectors (e.g., column selectors CS1, CS2, and CS3) and the control terminals of the corresponding current sources (e.g., current sources C1, C2, and C3).

A PWM signal may be a 14-bit gray scale. A PWM signal may have a length of 14 bits. When the brightness of a LED is controlled by different current levels, a current source provides 10 mA, a PWM signal has a length of 14 bits, and the minimum lit current can be calculated as $$\frac{10\text{ mA}}{2^{14}} = 0.61\ \mu\text{A}.$$

Since the minimum lit current, 0.61 μA, may be too low to drive a LED, the lit LED may thus experience serious color shift. Furthermore, the minimum lit current may be the base step current to adjust the brightness. The base step current may be too low to correctly reflect the corresponding step brightness.

Figure 2A:
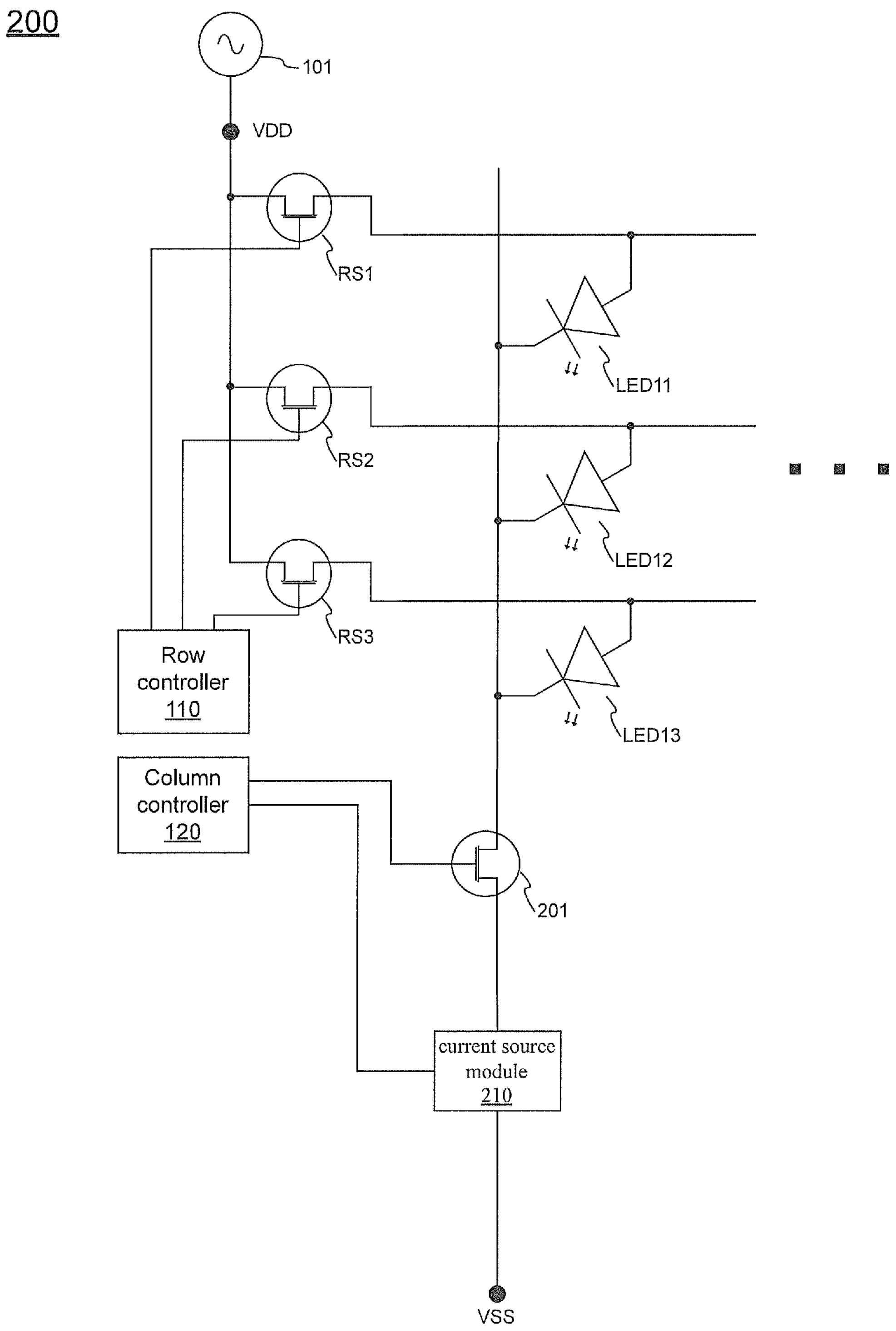
FIGS. 2A to 2E illustrates display apparatuses according to some embodiments of the present disclosure.

FIG. 2A illustrates a display apparatus 200 with hybrid brightness control according to some embodiments of the present disclosure. With respect to the display apparatus 200, the column controller 120 of the display apparatus 100 in FIG. 1 may be coupled to both of the column selector 201 and the current source module 210. The column selector 201 may be coupled to the current source module 210 in series. In some embodiment, the current source module 210 may be regarded as a switch to provide different levels of currents.

For the purpose of simplicity and clarity, only one column of LEDs and the corresponding column selector and current source module is illustrated in FIG. 2A. In some embodiments, the display apparatus 200 may include a plurality of columns of LEDs, and each column of LEDs may be coupled to the corresponding column selector and current source module. Additionally, a column of LEDs may include one or more LEDs.

In FIG. 2A, the column controller 120 may generate a control signal to control the column selector 201 and the current source module 210. The column selector 201 may control how long the selected LED is lit. In particular, the column selector 201 may control the lit time of the selected LED. The PWM dimming method may be applied to control the lit time of the selected LED through the column selector 201. The current source module 210 may control the current level through the selected LED. In particular, the current source module 210 may control the current level applied to the selected LED. The PWM dimming method may be applied to control the current level through the selected LED. The selected LED may be determined by a row selector during a scan period and a column selector.

A control signal generated by the column controller 120 may control the column selector 201 and the current source module 210. In particular, a first portion of the control signal may be used to control the column selector 201 and a second portion of the control signal may be used to control the current source module 210. For example, the column controller 120 may generate a 14-bit control signal, wherein 6 bits may be used to control the lit time of the selected LED with the column selector 201, and the remaining 8 bits may be used to control the current level through the selected LED with the current source module 210. In an embodiment in which 6 bits is for the lit time and 8 bits is for the current level, the effective gray scales may be 6287.

Since 6 bits is for the lit time, the minimum lit time may be $$\frac{1\text{ s}}{60\times 32\times 2^{6}} = 8.138\ \mu\text{s}.$$

Because 8.138 μs is much higher than the response time of a general LED (e.g., 20 ns), the LED will be lit as expected. Since 8 bits is for the current level, when the maximum current for a LED is 10 mA, the minimum lit current can be calculated as $$\frac{10\text{ mA}}{2^{8}} = 39.06\ \mu\text{A}.$$

Under this minimum lit current, 39.06 μA, the LED will be driven properly, and the color shift avoided.

Figure 2B:
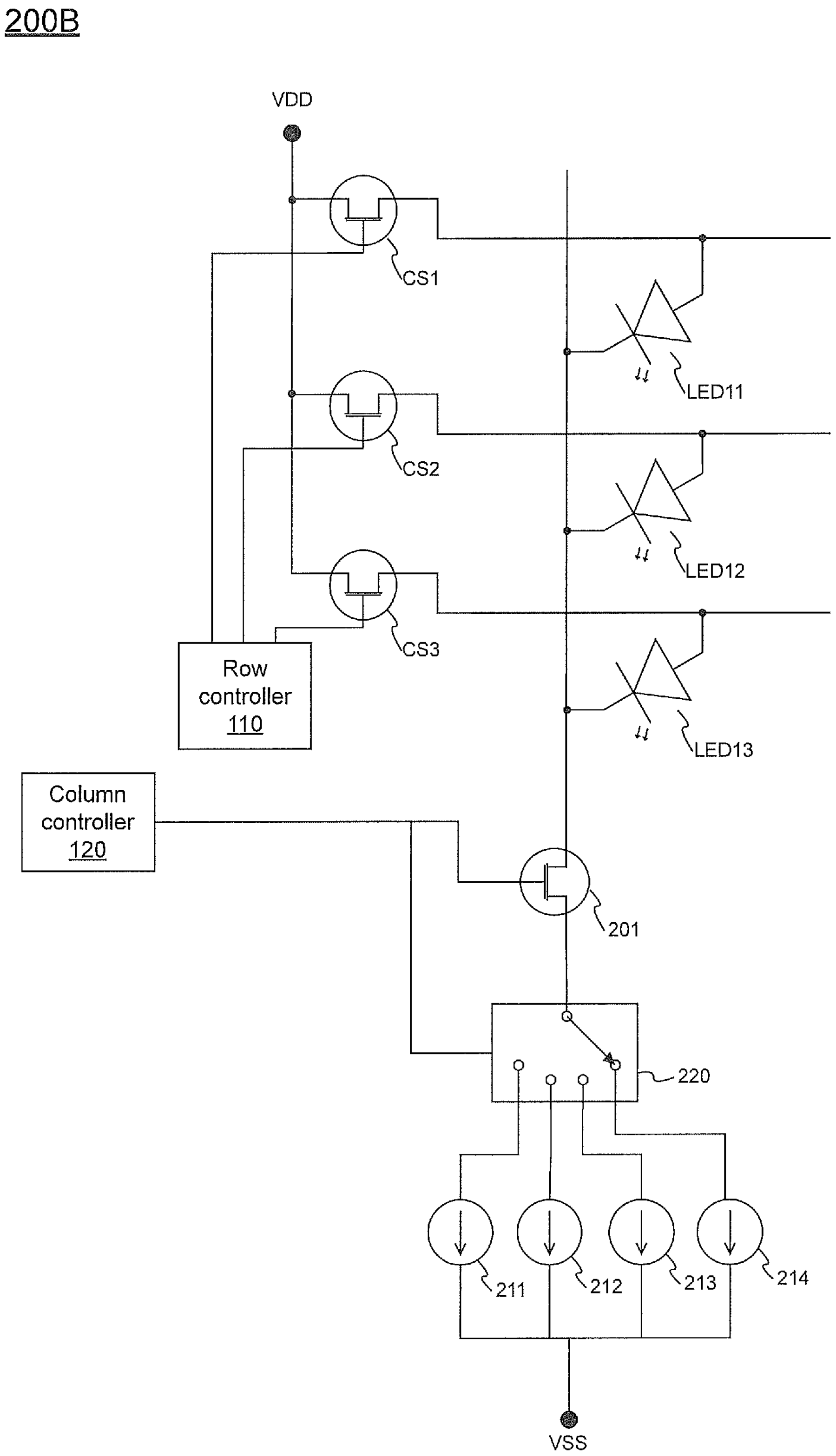

FIG. 2B illustrates a display apparatus 200B with hybrid brightness control according to some embodiments of the present disclosure. With respect to the display apparatus 200B, the current source module 210 of the display apparatus 200 in FIG. 2A may be replaced with the combination of a switch 220 and a plurality of current sources (e.g., current sources 211, 212, 213, and 214). The switch 220 may be a single-pole multi-throw switch.

For the purpose of simplicity and clarity, the switch 220 is a single-pole four-throw switch. Each throw of the switch 220 is coupled to the corresponding one of the current sources 211, 212, 213, and 214. Each of the current sources 211, 212, 213, and 214 may provide different levels of current. Since the switch 220 is a single-pole four-throw switch, the switch 220 may support a 2-bit control signal from the column controller 120, and the current sources 211, 212, 213, and 214 may provide four different levels of current.

In an embodiment in which column controller 120 generates a 3-bit control signal, one bit of the 3-bit control signal may be used to control the column selector 201 based on a PWM dimming method, and two bits of the 3-bit control signal may be used to control the switch 220. The corresponding true value table is shown in Table 2.

TABLE 2

| True Value Table | | |
|---|---|---|
| Control signal | Bits for switch 220 | Bit for column selector 201 |
| 000 | 00 | 0 |
| 001 | 00 | 1 |
| 010 | 01 | 0 |
| 011 | 01 | 1 |
| 100 | 10 | 0 |
| 101 | 10 | 1 |
| 110 | 11 | 0 |
| 111 | 11 | 1 |

Referring to Table 2, when the two bits for the switch 220 are 00, the current source 211 may be selected. When the two bits for the switch 220 are 01, the current source 212 may be selected. When the two bits for the switch 220 are 10, the current source 213 may be selected. When the two bits for the switch 220 are 11, the current source 214 may be selected. Referring to Table 2, when the bit for the column selector 201 is 0, the selected LED may be lit for a first time (T1). When the bit for the column selector 201 is 1, the selected LED may be lit for a second time (T2). The first and second times (T1 and T2) are different. T2 may exceed T1. In some embodiments, the minimum duty cycle of the column selector 201 may be 50% (e.g., when the corresponding bit is 0).

Figure 2C:
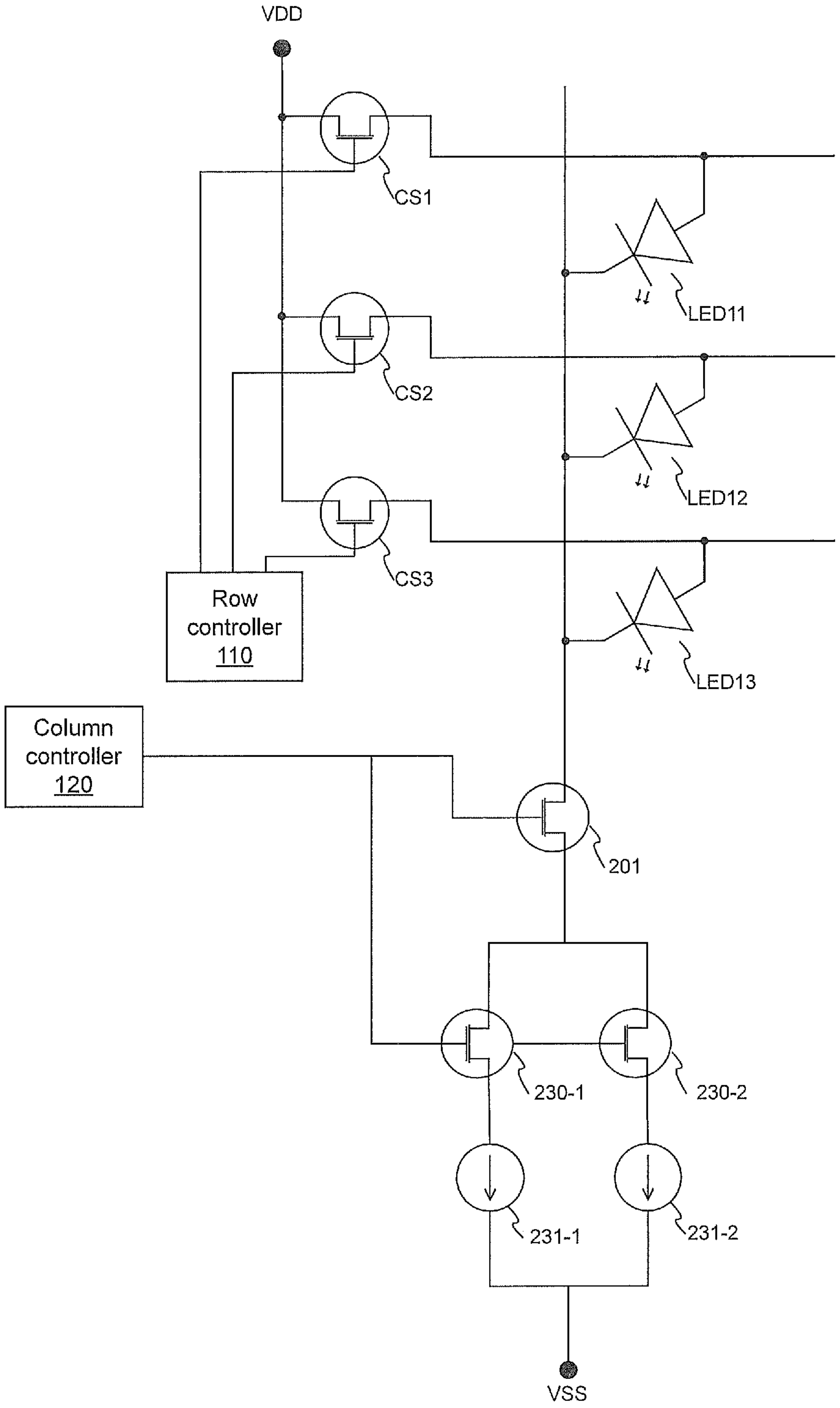

FIG. 2C illustrates a display apparatus 200C with hybrid brightness control according to some embodiments of the present disclosure. With respect to the display apparatus 200C, the current source module 210 of the display apparatus 200 in FIG. 2A may be replaced with the combination of switches 230-1 and 230-2 and current sources 231-1 and 231-2. Each of the switches 230-1 and 230-2 may be a single-pole single-throw switch or a switch transistor.

The switch 230-1 is coupled to the current source 231-1, and the switch 230-1 can control whether the current from the current source 231-1 flows through the selected LED. The switch 230-2 is coupled to the current source 231-2, and the switch 230-2 can control whether the current from the current source 231-2 flows through the selected LED. The current sources 231-1 and 231-2 may provide different amperage. For example, the current source 231-1 may provide 100 μA, and the current source 231-2 may provide 200 μA. In another example, the current source 231-1 may provide 200 μA, and the current source 231-2 may provide 400 μA.

Since the two switches 230-1 and 230-2 are used in the display apparatus 200C, the two switches 230-1 and 230-2 may support a 2-bit control signal from the column controller 120 and provide four different levels of current using different combinations of the current sources 231-1 and 231-2.

In FIG. 2C, a switch and the corresponding current may be referred to as a current supply set. For the purpose of simplicity and clarity, there are two current supply sets illustrated in FIG. 2C, in which one current supply set includes the switch 230-1 and the current source 231-1 and the other current supply set includes the switch 230-2 and the current source 231-2. One or more current supplies may be implemented in the display apparatus 200C of FIG. 2C. For example, when one current supply is implemented in the display apparatus 200C, the current supply may support a 1-bit control signal from the column controller 120 and provide two different levels of current. In another example, when three current supplies are implemented in the display apparatus 200C, the current supplies may support a 3-bit control signal from the column controller 120 and provide eight different levels of current, and the three current sources may provide 100 μA, 200 μA, and 400 μA, respectively.

Referring to FIG. 2C, in an embodiment in which column controller 120 generates a 3-bit control signal, one bit of the 3-bit control signal may be used to control the column selector 201 based on a PWM dimming method, and two bits of the 3-bit control signal may be used to control the switches 230-1 and 230-2. The corresponding true value table is shown in Table 3.

TABLE 3

| True Value Table | | |
|---|---|---|
| Control signal | Bits for switches 230-1 and 230-2 | Bit for column selector 201 |
| 000 | 00 | 0 |
| 001 | 00 | 1 |
| 010 | 01 | 0 |
| 011 | 01 | 1 |
| 100 | 10 | 0 |
| 101 | 10 | 1 |
| 110 | 11 | 0 |
| 111 | 11 | 1 |

Referring to Table 3, when the two bits for the switches 230-1 and 230-2 are 00, none of the switches 230-1 and 230-2 may be on. When the two bits for the switches 230-1 and 230-2 are 01, the switch 230-1 may be on (e.g., the switch which causes the lower level of current may be on). When the two bits for the switches 230-1 and 230-2 is 10, the switch 230-2 may be on (e.g., the switch which causes the higher level of current may be on). When the two bits for the switches 230-1 and 230-2 are 11, both of the switches 230-1 and 230-2 may be on. Referring to Table 3, when the bit for the column selector 201 is 0, the selected LED may be lit for a first time (T1). When the bit for the column selector 201 is 1, the selected LED may be lit for a second time (T2). The first and second times (T1 and T2) are different. T2 may exceed T1. In some embodiments, the minimum duty cycle of the column selector 201 may be 50% (e.g., when the corresponding bit is 0).

Figure 2D:
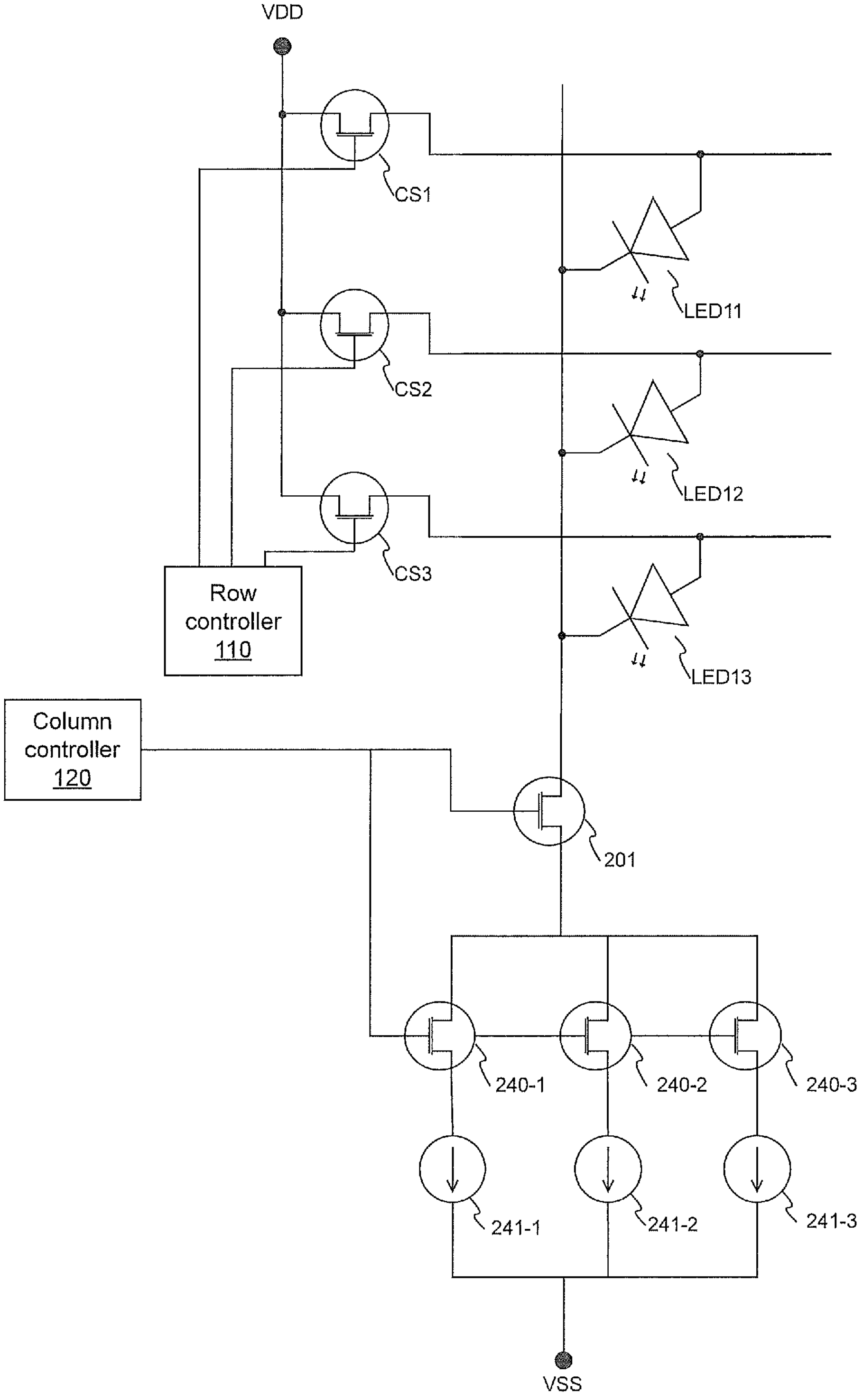

FIG. 2D illustrates a display apparatus 200D with hybrid brightness control according to some embodiments of the present disclosure. With respect to the display apparatus 200D, the current source module 210 of the display apparatus 200 in FIG. 2A may be replaced with the combination of switches 240-1, 240-2, 240-3 and current sources 241-1, 241-2, 241-3. Each of the switches 240-1, 240-2, 240-3 may be a single-pole single-throw switch or a switch transistor.

The switch 240-1 is coupled to the current source 241-1, and the switch 240-1 can control whether the current from the current source 241-1 flows through the selected LED. The switch 240-2 is coupled to the current source 241-2, and the switch 240-2 can control whether the current from the current source 241-2 flows through the selected LED. The switch 240-3 is coupled to the current source 241-3, and the switch 240-3 can control whether the current from the current source 241-3 flows through the selected LED. The current sources 241-1, 241-2, 241-3 may provide the same amperage. For example, the current sources 241-1, 241-2, 241-3 may provide 100 μA. In another example, the current sources 241-1, 241-2, 241-3 may provide 200 μA.

The three switches 240-1, 240-2, 240-3 in the display apparatus 200D may be used to support a 2-bit control signal from the column controller 120 and provide four different levels of current using different combinations of the current sources 241-1, 241-2, 241-3.

In FIG. 2D, a switch and the corresponding current may be referred to as a current supply set. For the purpose of simplicity and clarity, there are three current supply sets illustrated in FIG. 2D, in which the first current supply set includes the switch 240-1 and the current source 241-1, the second current supply set includes the switch 240-2 and the current source 241-2, and the fourth third current supply set includes the switch 240-3 and the current source 241-3. One or more current supplies may be implemented in the display apparatus 200D of FIG. 2D. For example, when one current supply is implemented in the display apparatus 200D, the current supplies may support a 1-bit control signal from the column controller 120 and provide two different levels of current. In another example, when seven current supplies are implemented in the display apparatus 200D, the current supplies may support a 3-bit control signal from the column controller 120 and provide eight different levels of current. In general, $2^n-1$ current supplies may be necessary to support a n-bit control signal from the column controller 120 and provide $2^n$ different levels of current.

Referring to FIG. 2D, in an embodiment in which column controller 120 generates a 3-bit control signal, one bit of the 3-bit control signal may be used to control the column selector 201 based on a PWM dimming method, and two bits of the 3-bit control signal may be further transformed to another 3-bit signal to control the switches 230-1 and 230-2. The corresponding true value table is shown in Table 4.

TABLE 4

True value table

| Control signal | Bit for Switch 240-3 | Bit for Switch 240-2 | Bit for Switch 240-1 | Bit for column selector 201 |
|---|---|---|---|---|
| 000 | 0 | 0 | 0 | 0 |
| 001 | 0 | 0 | 0 | 1 |
| 010 | 0 | 0 | 1 | 0 |
| 011 | 0 | 0 | 1 | 1 |
| 100 | 0 | 1 | 1 | 0 |
| 101 | 0 | 1 | 1 | 1 |
| 110 | 1 | 1 | 1 | 0 |
| 111 | 1 | 1 | 1 | 1 |

Referring to Table 4, when the three bits for the switches 240-1, 240-2, and 240-3 are 000, none of the switches 240-1, 240-2, and 240-3 may be on. When the three bits for the switches 240-1, 240-2, and 240-3 are 001, the switch 240-1 may be on. When the three bits for the switches 240-1, 240-2, and 240-3 are 011, the switches 240-1 and 240-2 may be on. When the three bits for the switches 240-1, 240-2, and 240-3 are is 111, all of the switches 240-1, 240-2, and 240-3 may be on. Referring to Table 4, when the bit for the column selector 201 is 0, the selected LED may be lit for a first time (T1). When the bit for the column selector 201 is 1, the selected LED may be lit for a second time (T2). The first and second times (T1 and T2) are different. T2 may exceed T1. In some embodiments, the minimum duty cycle of the column selector 201 may be 50% (e.g., when the corresponding bit is 0).

Figure 2E:
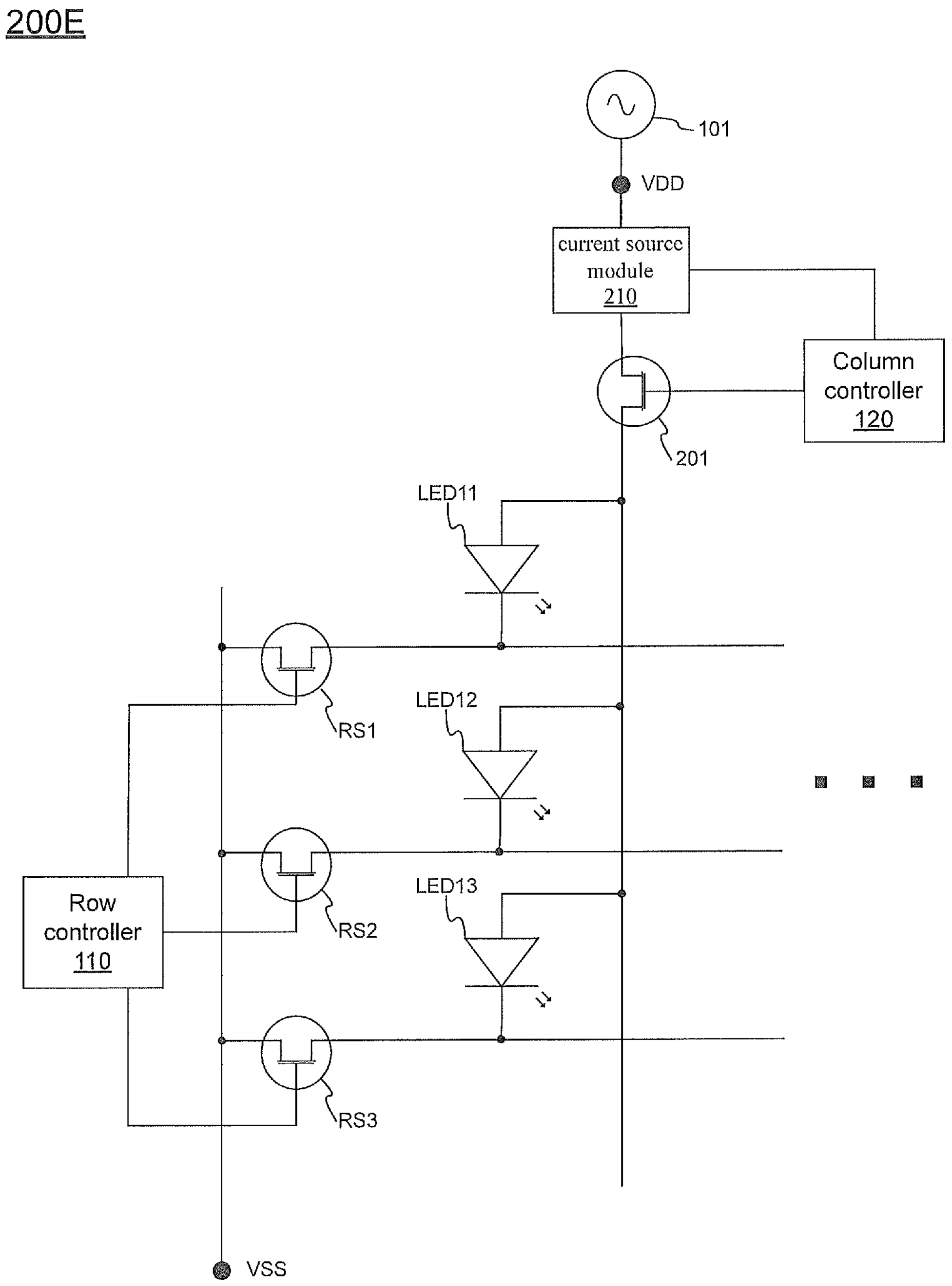

FIG. 2E illustrates a display apparatus 200E with hybrid brightness control according to some embodiments of the present disclosure. In the display apparatus 200E, the column selector 201, the current source module 210, and the power source 101 may be coupled in series. The power source 101 may provide a power level, e.g., voltage VDD. The column selector 201 and the current source module 210 may be coupled to the voltage VDD. The column controller 120 of the display apparatus 200E may be coupled to both of the column selector 201 and the current source module 210.

In FIG. 2E, one end of the row selector RS1 may be coupled to the LED11, and the other end of the row selector RS1 may be coupled to another power level, e.g., voltage VSS. One end of the row selector RS2 may be coupled to the LED12, and the other end of the row selector RS2 may be coupled to another power level, e.g., voltage VSS. One end of the row selector RS3 may be coupled to the LED13, and the other end of the row selector RS3 may be coupled to another power level, e.g., voltage VSS. The gates of the row selectors RS1, RS2, and RS3 may be coupled to the row controller 110. The row controller 110 can control the switching of each of the row selectors RS1, RS2, and RS3.

In some embodiments, the current source module 210 of the display apparatus 200E in FIG. 2E may be replaced with the combination of a switch 220 and a plurality of current sources (e.g., current sources 211, 212, 213, and 214) as shown in FIG. 2B. In some embodiments, the current source module 210 of the display apparatus 200E in FIG. 2E may be replaced with the combination of switches 230-1 and 230-2 and current sources 231-1 and 231-2 as shown in FIG. 2C. In some embodiments, the current source module 210 of the display apparatus 200E in FIG. 2E may be replaced with the combination of switches 240-1, 240-2, 240-3 and current sources 241-1, 241-2, 241-3 as shown in FIG. 2D.

Figure 3A:
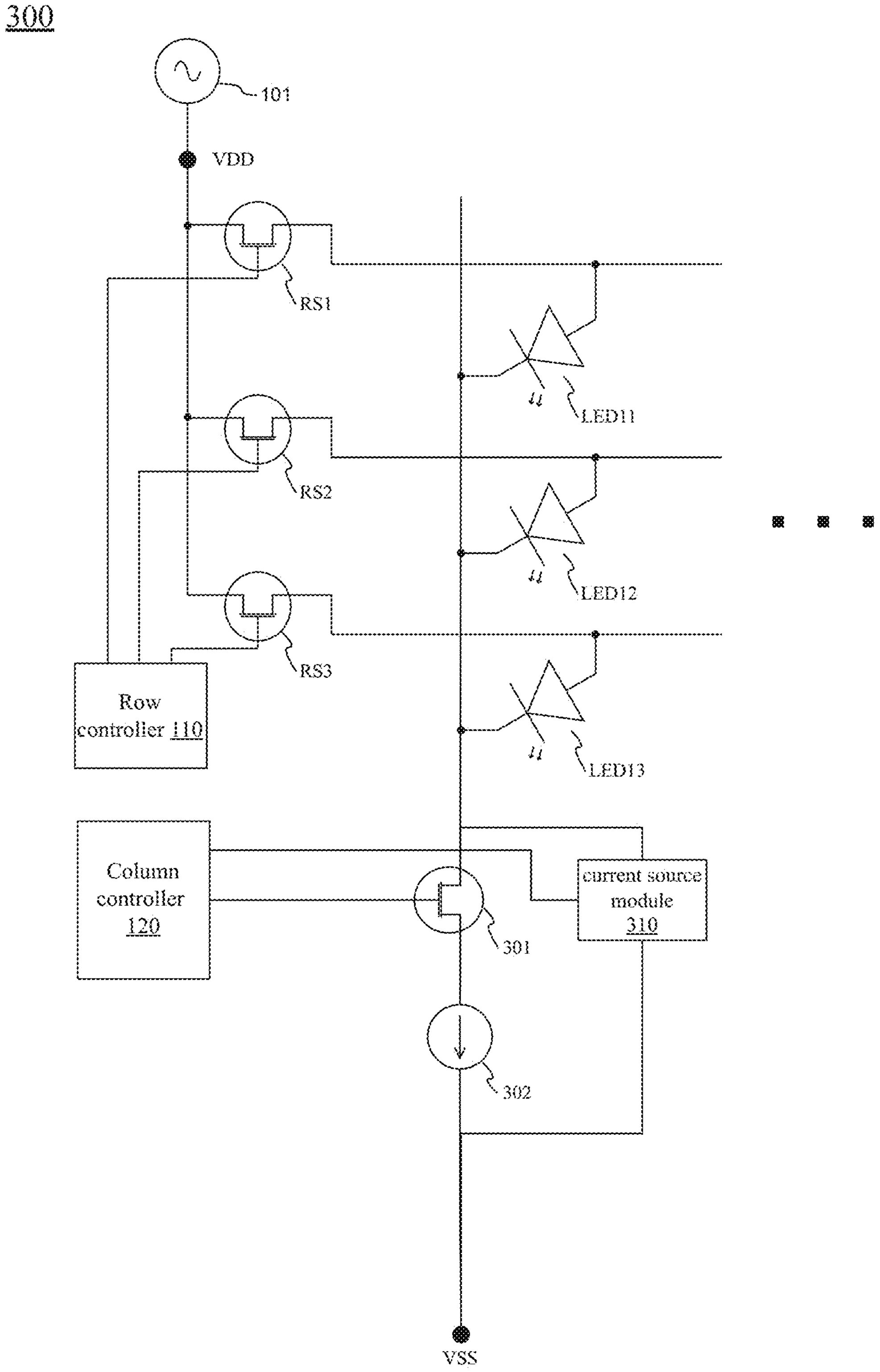
FIGS. 3A to 3E illustrates display apparatuses according to some embodiments of the present disclosure.

FIG. 3A illustrates a display apparatus 300 with hybrid brightness control according to some embodiments of the present disclosure. With respect to the display apparatus 300, the column controller 120 of the display apparatus 100 in FIG. 1 may be coupled to both of the column selector 301 and the current source module 310. The column selector 301 may be coupled to the current source 302 in series. The combination of the column selector 301 and the current source 302 may be coupled to the current source module 310 in parallel. In some embodiments, the current source module 310 may be regarded as a switch to provide different levels of current.

For the purpose of simplicity and clarity, only one column of LEDs and the corresponding column selector and current source module is illustrated in FIG. 3A. In some embodiments, the display apparatus 300 may include a plurality of columns of LEDs, and each column of LEDs may be coupled to the corresponding column selector and current source module. Additionally, a column of LEDs may include one or more LEDs.

In FIG. 3A, the column controller 120 may generate a control signal to control the column selector 301 and the current source module 310. The column selector 301 may control how long the selected LED is lit by the current source 302. In particular, the column selector 301 may control the lit time of the selected LED lit by the current source 302. The PWM dimming method may be applied to control the lit time of the selected LED through the column selector 301. The current source module 310 may control the current level through the selected LED in addition to the current caused by the current source 302. In particular, the current source module 310 may control the current level applied to the selected LED in addition to the current caused by the current source 302. The PWM dimming method may be applied to control the current level generated by the current source module 310.

A control signal generated by the column controller 120 may control the column selector 301 and the current source module 310. In particular, a first portion of the control signal may be used to control the column selector 301 and a second portion of the control signal may be used to control the current source module 310. For example, the column selector 301 may generate a 14-bit control signal. 6 bits of the 14-bit control signal may be fed to the column selector 301 and used to control the lit time of the selected LED lit by the current source 302. 8 bits of the 14-bit control signal may be fed to the current source module 310 and used to control the current level through the selected LED in addition to that caused by the current source 302. In the embodiment in which 6 bits is fed to the column selector 301 and 8 bits is fed to the current source module 310, the effective gray scales may be 16384.

Since 6 bits is fed to the column selector 301 for the lit time, the minimum lit time may be $$\frac{1\ \text{s}}{60\times 32\times 2^6} = 8.138\ \mu\text{s}.$$

Because 8.138 μs is much higher than the response time of a general LED (e.g., 20 ns), the LED will be lit as expected. Since 8 bits are fed to the current source module 310 for the additional current level, when the maximum current for a LED is 10 mA, the minimum lit current can be calculated as $$\frac{10\ \text{mA}}{2^8} = 39.06\ \mu\text{A}$$

(wherein "8" indicates the 8-bit fed to the current source module 310). Under this minimum lit current, 39.06 μA, the LED will be driven properly, and color shift avoided.

Figure 3B:
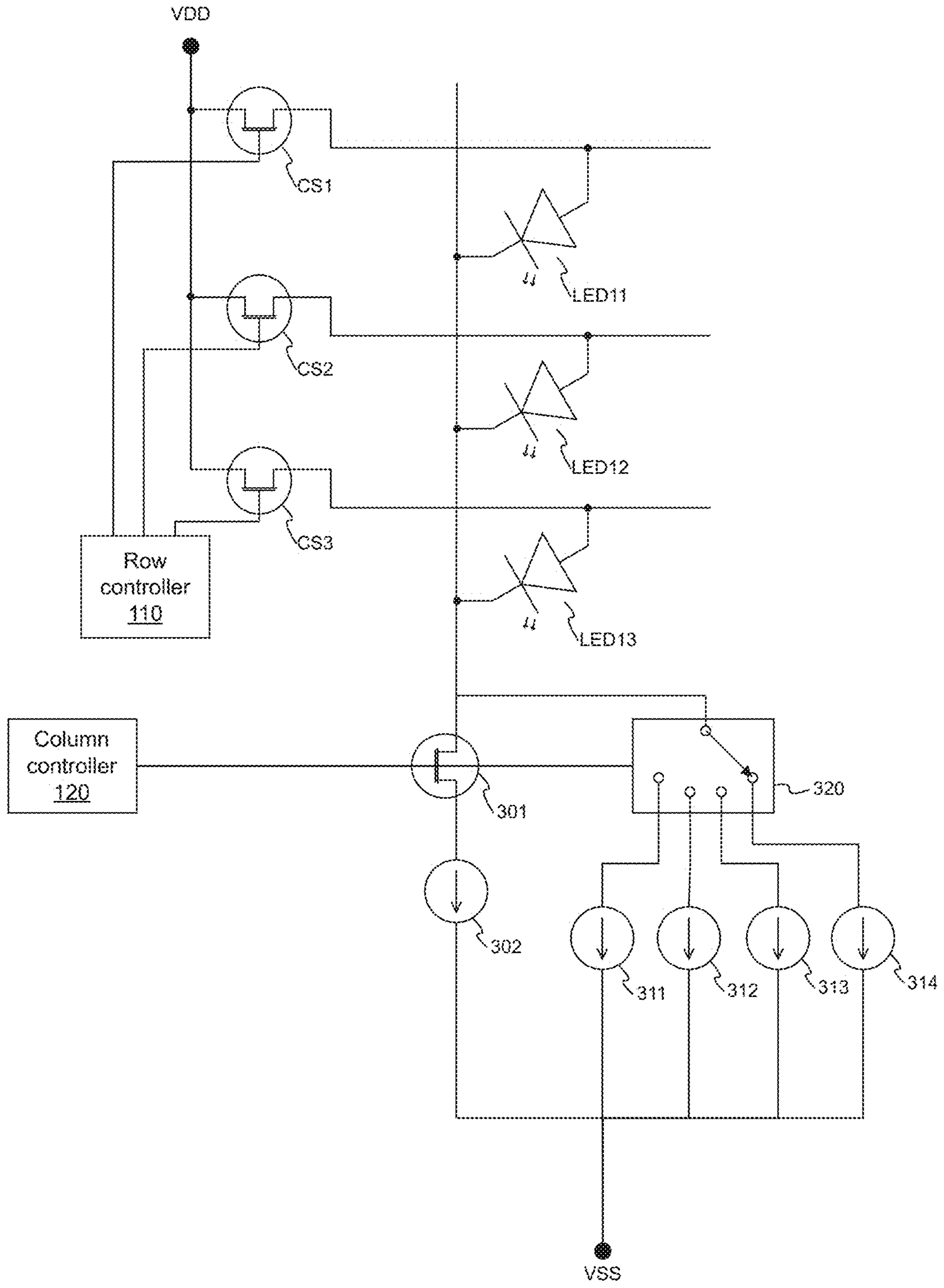

FIG. 3B illustrates a display apparatus 300B according to some embodiments of the present disclosure. With respect to the display apparatus 300B, the current source module 310 of the display apparatus 300 in FIG. 3A may be replaced with the combination of a switch 320 and a plurality of current sources (e.g., current sources 311, 312, 313, and 314). The switch 220 may be a single-pole multi-throw switch.

For the purpose of simplicity and clarity, the switch 320 is a single-pole four-throw switch. Each throw of the switch 320 is coupled to the corresponding one of the current sources 311, 312, 313, and 314. Each of the current sources 311, 312, 313, and 314 may provide different levels of current. Since the switch 320 is a single-pole four-throw switch, the switch 320 may support a 2-bit control signal from the column controller 120, and the current sources 311, 312, 313, and 314 may provide four different levels of current.

In an embodiment in which column controller 120 generates a 3-bit control signal, one bit of the 3-bit control signal may be fed to the column selector 301, and two bits of the 3-bit control signal may be fed to the switch 220. The corresponding true value table is shown in Table 5.

TABLE 5

True Value Table

| Control signal | Bits for switch 320 | Bit for column selector 301 |
|---|---|---|
| 000 | 00 | 0 |
| 001 | 00 | 1 |
| 010 | 01 | 0 |
| 011 | 01 | 1 |
| 100 | 10 | 0 |
| 101 | 10 | 1 |
| 110 | 11 | 0 |
| 111 | 11 | 1 |

Referring to Table 5, when the two bits for the switch 320 are 00, the current source 311 may be selected. When the two bits for the switch 320 are 01, the current source 312 may be selected. When the two bits for the switch 320 are 10, the current source 313 may be selected. When the two bits for the switch 320 are 11, the current source 314 may be selected. Referring to Table 5, when the bit for the column selector 301 is 0, the selected LED may be lit by the current source 302 for a first time (T1). When the bit for the column selector 301 is 1, the selected LED may be lit by the current source 302 for a second time (T2). The first and second times (T1 and T2) are different. T2 may exceed T1. In some embodiments, the minimum duty cycle of the column selector 301 may be 50% (e.g., when the corresponding bit is 0).

Figure 3C:
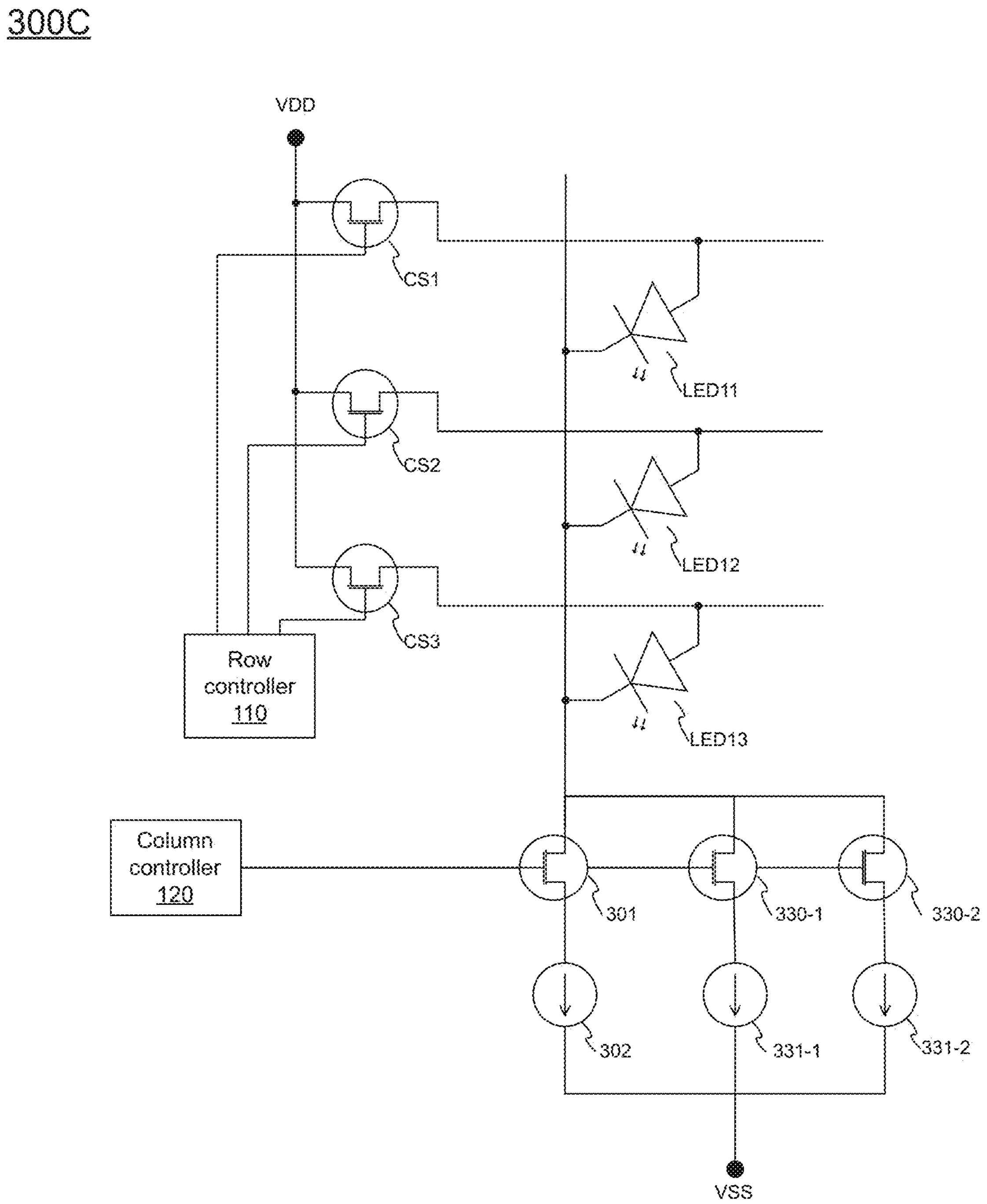

FIG. 3C illustrates a display apparatus 300C according to some embodiments of the present disclosure. With respect to the display apparatus 300C, the current source module 310 of the display apparatus 300 in FIG. 3A may be replaced with the combination of switches 330-1 and 330-2 and current sources 331-1 and 331-2. Each of the switches 330-1 and 330-2 may be a single-pole single-throw switch or a switch transistor.

The switch 330-1 is coupled to the current source 331-1, and the switch 330-1 can control whether the current from the current source 331-1 flows through the selected LED. The switch 330-2 is coupled to the current source 331-2, and the switch 330-2 can control whether the current from the current source 331-2 flows through the selected LED. The current sources 331-1 and 331-2 may provide different amperages. For example, the current source 331-1 may provide 100 μA, the current source 331-2 may provide 200 μA, and the current source 302 may provide 100 μA (if the column selector 301 uses 1-bit PWM dimming method). In another example, the current source 331-1 may provide 200 μA, and the current source 331-2 may provide 400 μA, and the current source 302 may provide 200 μA (if the column selector 301 uses 1-bit PWM dimming method).

Since the two switches 330-1 and 330-2 are used in the display apparatus 300C, the two switches 330-1 and 330-2 may support a 2-bit control signal from the column controller 120 and provide four different levels of current using different combinations of the current sources 331-1 and 331-2.

In FIG. 3C, a switch and the corresponding current may be referred to as a current supply set. For the purpose of simplicity and clarity, in addition to the column selector 301 and the current source 302, two current supply sets are illustrated in FIG. 3C, in which one current supply set includes the switch 330-1 and the current source 331-1 and the other current supply set includes the switch 330-2 and the current source 331-2. In addition to the column selector 301 and the current source 302, one or more current supplies may be implemented in the display apparatus 300C of FIG.

3C. For example, in addition to the column selector 301 and the current source 302, when one current supply is implemented in the display apparatus 300C, the current supply may support a 1-bit control signal from the column controller 120 and provide two different levels of current. In another example, in addition to the column selector 301 and the current source 302, when three current supplies are implemented in the display apparatus 300C, the current supplies may support a 3-bit control signal from the column controller 120 and provide eight different levels of current, and the three current sources may provide 100 μA, 200 μA, and 400 μA, respectively (in which the column selector 301 uses 1-bit PWM dimming method and the current source 302 may provide 100 μA).

Referring to FIG. 3C, in an embodiment in which column controller 120 generates a 4-bit control signal, two bits of the 4-bit control signal may be used to control the column selector 301 based on a PWM dimming method, and two bits of the 4-bit control signal may be used to control the switches 330-1 and 330-2. The corresponding true value table is shown in Table 6.

TABLE 6

| True Value Table | | |
|---|---|---|
| Control signal | Bits for switches 330-1 and 330-2 | Bit for column selector 301 |
| 0000 | 00 | 00 |
| 0001 | 00 | 01 |
| 0010 | 00 | 10 |
| 0011 | 00 | 11 |
| 0100 | 01 | 00 |
| 0101 | 01 | 01 |
| 0110 | 01 | 10 |
| 0111 | 01 | 11 |
| 1000 | 10 | 00 |
| 1001 | 10 | 01 |
| 1010 | 10 | 10 |
| 1011 | 10 | 11 |
| 1100 | 11 | 00 |
| 1101 | 11 | 01 |
| 1110 | 11 | 10 |
| 1111 | 11 | 11 |

Referring to Table 6, when the two bits for the switches 330-1 and 330-2 are 00, none of the switches 330-1 and 330-2 may be on. When the two bits for the switches 330-1 and 330-2 are 01, the switch 330-1 may be on (e.g., the switch which causes the lower level of current may be on). When the two bits for the switches 330-1 and 330-2 is 10, the switch 330-2 may be on (e.g., the switch which causes the higher level of current may be on). When the two bits for the switches 330-1 and 330-2 are 11, both of the switches 330-1 and 330-2 may be on. Referring to Table 6, when the bit for the column selector 301 is 00, the selected LED may be lit for a first time (T1). When the bit for the column selector 301 is 01, the selected LED may be lit for a second time (T2). When the bit for the column selector 301 is 10, the selected LED may be lit for a third time (T3). When the bit for the column selector 301 is 11, the selected LED may be lit for a fourth time (T4). The first, second, third, and fourth times (T1, T2, T3, and T4) are different. The relationship between first, second, third, and fourth times (T1, T2, T3, and T4) may be T4>T3>T2>T1. In some embodiments, the minimum duty cycle of the column selector 301 may be 25% (e.g., when the corresponding bit is 00). In some embodiments according to Table 6, the current source 331-1 may provide 100 μA, the current source 331-2 may provide 200 μA, and the current source 302 may provide 200 μA (because the column selector 301 uses 2-bit PWM dimming method).

Figure 3D:
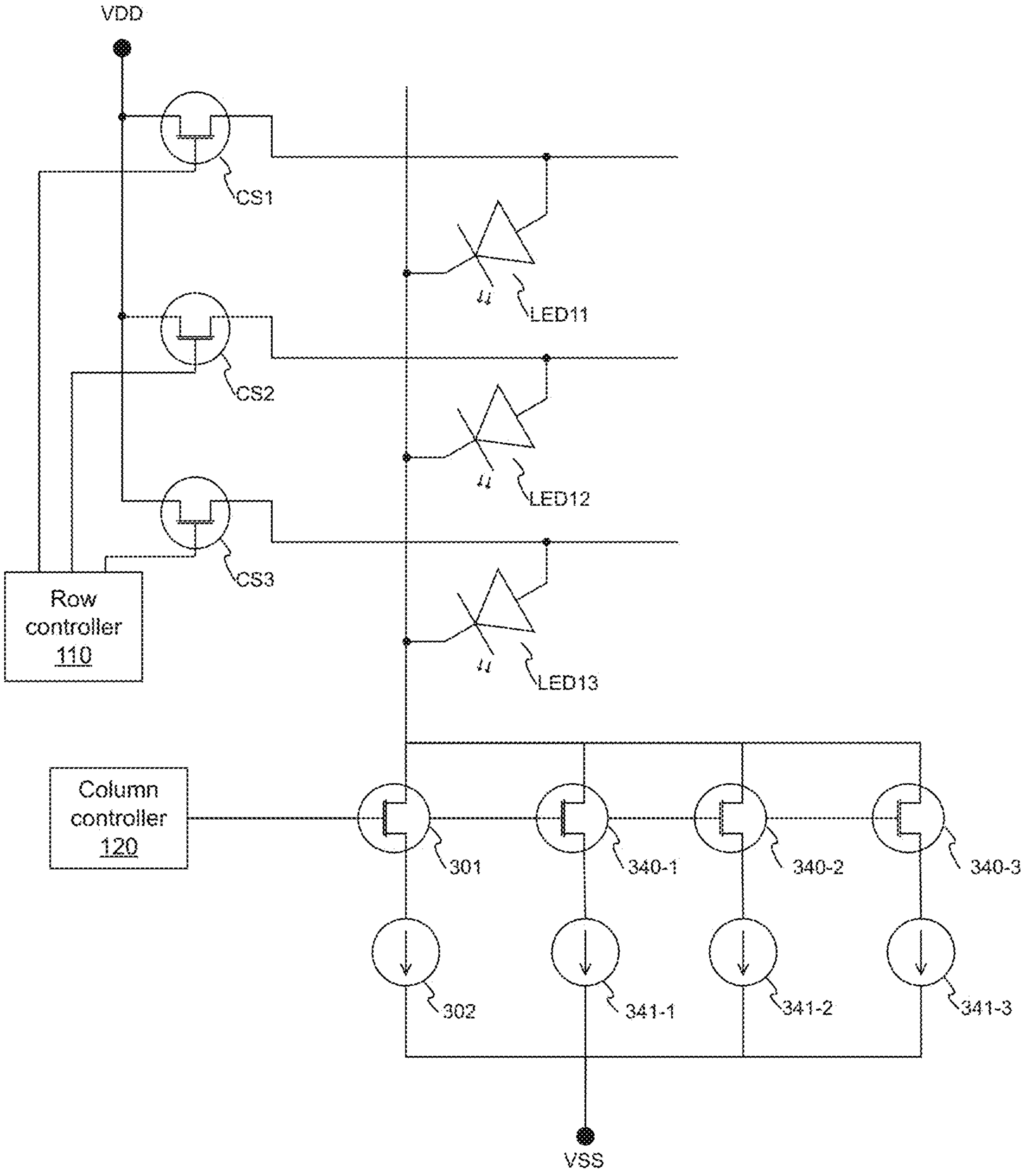

FIG. 3D illustrates a display apparatus 300D according to some embodiments of the present disclosure. With respect to the display apparatus 300D, the current source module 310 of the display apparatus 300 in FIG. 3A may be replaced with the combination of switches 340-1, 340-2, and 340-3 and current sources 341-1, 341-2, 341-3. Each of the switches 340-1, 340-2, and 340-3 may be a single-pole single-throw switch or a switch transistor.

The switch 340-1 is coupled to the current source 341-1, and the switch 340-1 can control whether the current from the current source 341-1 flows through the selected LED. The switch 340-2 is coupled to the current source 341-2, and the switch 340-2 can control whether the current from the current source 341-2 flows through the selected LED. The switch 340-3 is coupled to the current source 341-3, and the switch 340-3 can control whether the current from the current source 341-3 flows through the selected LED. The current sources 341-1, 341-2, 341-3 may provide the same amperage. For example, the current sources 341-1, 341-2, 341-3 may provide 100 μA, and the current source 302 may provide 100 μA (if the column selector 301 uses 1-bit PWM dimming method). In another example, the current sources 341-1, 341-2, 341-3 may provide 200 μA, and the current source 302 may provide 200 μA (if the column selector 301 uses 1-bit PWM dimming method).

The three switches 340-1, 340-2, 340-3 in the display apparatus 300D may be used to support a 2-bit control signal from the column controller 120 and provide four different levels of current using different combinations of the current sources 341-1, 341-2, 341-3.

In FIG. 3D, a switch and the corresponding current may be referred to as a current supply set. For the purpose of simplicity and clarity, in addition to the column selector 301 and the current source 302, three current supply sets are illustrated in FIG. 3D, in which the first current supply set includes the switch 340-1 and the current source 341-1, the second current supply set includes the switch 340-2 and the current source 341-2, and the third current supply set include the switch 340-3 and the current source 341-3. In addition to the column selector 301 and the current source 302, one or more current supplies may be implemented in the display apparatus 300D of FIG. 3D. For example, in addition to the column selector 301 and the current source 302, when one current supply is implemented in the display apparatus 300D, the current supplies may support a 1-bit control signal from the column controller 120 and provide two different levels of current. In another example, in addition to the column selector 301 and the current source 302, when seven current supplies are implemented in the display apparatus 200D, the current supplies may support a 3-bit control signal from the column controller 120 and provide eight different levels of current, and the three current sources may provide 100 μA, 200 μA, and 400 μA, respectively (in which the column selector 301 uses 1-bit PWM dimming method and the current source 302 may provide 100 μA). In general, in addition to the column selector 301 and the current source 302, $2^n-1$ current supplies may be necessary to support an n-bit control signal from the column controller 120 and provide $2^n$ different levels of current.

Referring to FIG. 3D, in an embodiment in which column controller 120 generates a 4-bit control signal, two bits of the 4-bit control signal may be used to control the column selector 201 based on a PWM dimming method, and two bits of the 4-bit control signal may be further transformed to another 3-bit signal to control the switches 340-1, 340-2, 340-3. The corresponding true value table is shown in Table 7.

TABLE 7

| True value table | | | | |
|---|---|---|---|---|
| Control signal | Bit for Switch 340-3 | Bit for Switch 340-2 | Bit for Switch 340-1 | Bit for column selector 301 |
| 0000 | 0 | 0 | 0 | 00 |
| 0001 | 0 | 0 | 0 | 01 |
| 0010 | 0 | 0 | 0 | 10 |
| 0011 | 0 | 0 | 0 | 11 |
| 0100 | 0 | 0 | 1 | 00 |
| 0101 | 0 | 0 | 1 | 01 |
| 0110 | 0 | 0 | 1 | 10 |
| 0111 | 0 | 0 | 1 | 11 |
| 1000 | 0 | 1 | 1 | 00 |
| 1001 | 0 | 1 | 1 | 01 |
| 1010 | 0 | 1 | 1 | 10 |
| 1011 | 0 | 1 | 1 | 11 |
| 1100 | 1 | 1 | 1 | 00 |
| 1101 | 1 | 1 | 1 | 01 |
| 1110 | 1 | 1 | 1 | 10 |
| 1111 | 1 | 1 | 1 | 11 |

Referring to Table 7, when the three bits for the switches 340-1, 340-2, and 340-3 are 000, none of the switches 340-1, 340-2, and 340-3 may be on. When the three bits for the switches 340-1, 340-2, and 340-3 are 001, the switch 340-1 may be on. When the three bits for the switches 340-1, 340-2, and 340-3 are 011, the switches 340-1 and 340-2 may be on. When the three bits for the switches 340-1, 340-2, and 340-3 are is 111, all of the switches 240-1, 240-2, and 240-3 may be on. Referring to Table 7, when the bit for the column selector 301 is 00, the selected LED may be lit for a first time (T1). When the bit for the column selector 301 is 01, the selected LED may be lit for a second time (T2). When the bit for the column selector 301 is 10, the selected LED may be lit for a third time (T3). When the bit for the column selector 301 is 11, the selected LED may be lit for a fourth time (T4). The first, second, third, and fourth times (T1, T2, T3, and T4) are different. The relationship between first, second, third, and fourth times (T1, T2, T3, and T4) may be T4>T3>T2>T1. In some embodiments, the minimum duty cycle of the column selector 301 may be 25% (e.g., when the corresponding bit is 00). In some embodiments according to Table 7, the current sources 341-1, 341-2, 341-3 may provide 100 μA, and the current source 302 may provide 200 μA (because the column selector 301 uses 2-bit PWM dimming method).

Figure 3E:
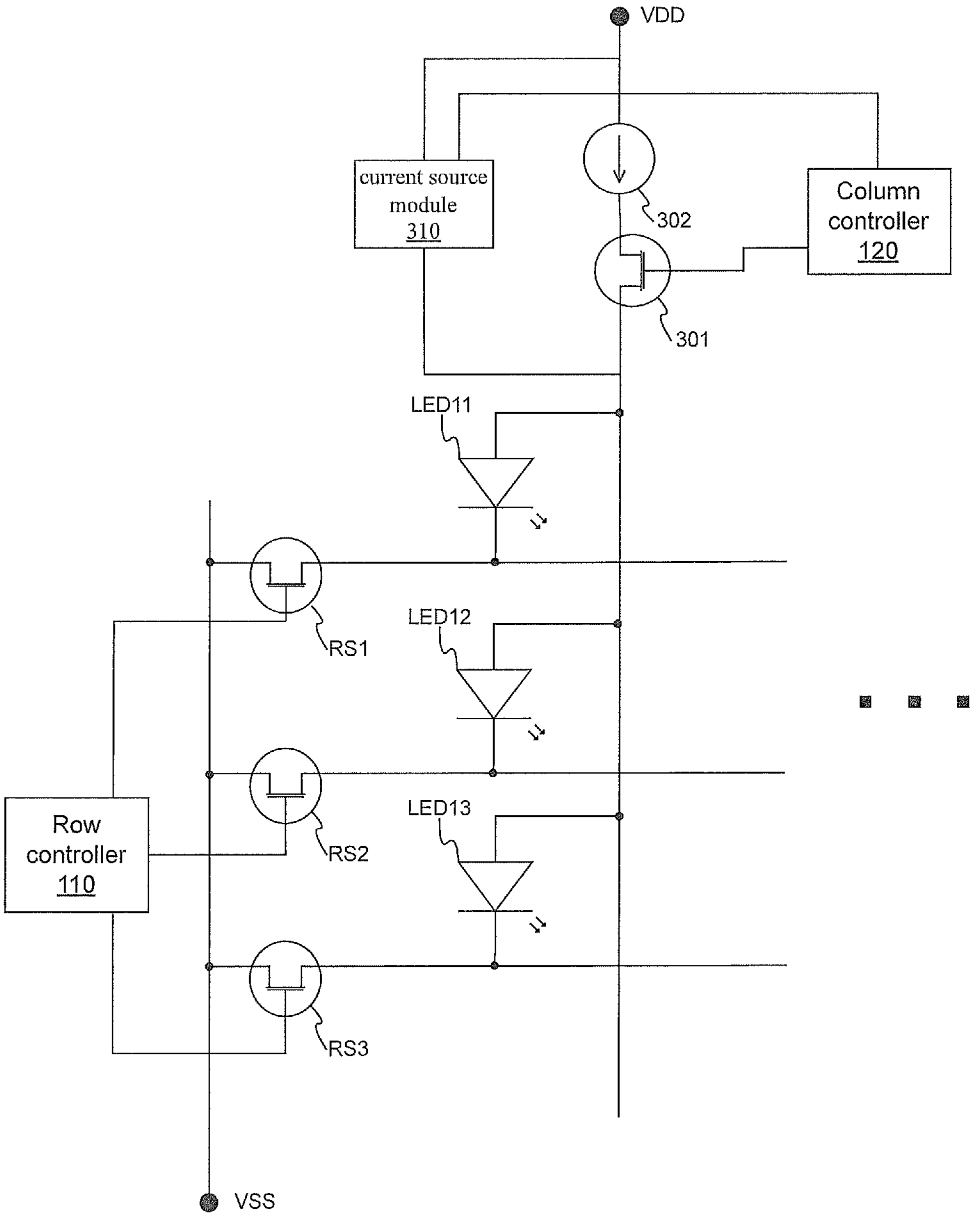

FIG. 3E illustrates a display apparatus 300E with hybrid brightness control according to some embodiments of the present disclosure. In the display apparatus 300E, the column selector 301 and the current source 302 may be coupled in series. The current source 302 may provide a power level, e.g., voltage VDD. The column controller 120 of the display apparatus 300E may be coupled to both of the column selector 301 and the current source module 310. The combination of the column selector 301 and the current source 302 may be coupled to the current source module 310 in parallel. In some embodiments, the current source module 310 may be regarded as a switch to provide different levels of current.

In FIG. 3E, one end of the row selector RS1 may be coupled to the LED11, and the other end of the row selector RS1 may be coupled to another power level, e.g., voltage VSS. One end of the row selector RS2 may be coupled to the LED12, and the other end of the row selector RS2 may be coupled to another power level, e.g., voltage VSS. One end of the row selector RS3 may be coupled to the LED13, and the other end of the row selector RS3 may be coupled to another power level, e.g., voltage VSS. The gates of the row selectors RS1, RS2, and RS3 may be coupled to the row controller 110. The row controller 110 can control the switching of each of the row selectors RS1, RS2, and RS3.

In some embodiments, the current source module 310 of the display apparatus 300E in FIG. 3E may be replaced with the combination of a switch 320 and a plurality of current sources (e.g., current sources 311, 312, 313, and 314) as shown in FIG. 3B. In some embodiments, the current source module 310 of the display apparatus 300E in FIG. 3E may be replaced with the combination of switches 330-1 and 330-2 and current sources 331-1 and 331-2 as shown in FIG. 3C. In some embodiments, the current source module 310 of the display apparatus 300E in FIG. 3E may be replaced the combination of switches 340-1, 340-2, and 340-3 and current sources 341-1, 341-2, 341-3 as shown in FIG. 3D.

As used herein, the singular terms "a," "an," and "the" may include plural referents unless the context clearly indicates otherwise. For example, reference to an electronic device may include multiple electronic devices unless the context clearly indicates otherwise.

As used herein, the terms "connect," "connected," "connection," "couple," "coupled," refer to an operational coupling or linking. Connected components can be directly or indirectly coupled to one another through, for example, another set of components.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless otherwise specifically indicated herein, the order and grouping of the operations are not limitations of the present disclosure.

What is claimed is:

1. A display apparatus, comprising:

a light emitting diode (LED) array comprising a plurality of LED columns;

a power source, electrically connected to the plurality of LED columns, configured to provide a first power level;

a controller configured to generate a control signal associated with a first LED column among the plurality of LED columns, wherein a length of the control signal is several bits; and a plurality of current paths electrically connected between the first LED column and a second power level, wherein the plurality of current paths are connected in parallel, wherein each of the plurality of current paths includes a switch and a current source connected in serial; and wherein the switch of a first current path of the plurality of current paths includes a PWM switch configured to close at a duty cycle during a scan period based on a first portion of the control signal, the switches of the other current paths of the plurality of current paths are controlled by a second portion of the control signal, and a current level provided by the current source of the first current path is based on the number of bits of the first portion of the control signal and the minimum current level provided by one of the current sources of the other current paths.

2. The display apparatus of claim 1, wherein:

a minimum duty cycle of the PWM switch equals to $\frac{1}{2}^{N_1}$, $N_1$ is the number of bits of the first portion of the control signal; and the current level provided by the current source of the first current path is $N_1$ times of the minimum current level amount.

3. The display apparatus of claim 1, wherein the current sources of the other current paths providing one or more currents with the same current level.

4. The display apparatus of claim 1, wherein current levels provided by the current sources of the other current paths are configured as a geometric sequence.

* * * * *